US008933631B2

(12) United States Patent
Hollander

(10) Patent No.: US 8,933,631 B2
(45) Date of Patent: Jan. 13, 2015

(54) LIGHT EMITTING DIODE (LED) LIGHTING FIXTURE

(75) Inventor: Jonathan Hollander, Petach Tikva (IL)

(73) Assignee: Metrolight Ltd., Netanya (IL)

( * ) Notice: Subject to any disclaimer, the term of this patent is extended or adjusted under 35 U.S.C. 154(b) by 214 days.

(21) Appl. No.: 13/539,737

(22) Filed: Jul. 2, 2012

(65) Prior Publication Data

US 2013/0009546 A1  Jan. 10, 2013

(30) Foreign Application Priority Data

Jul. 4, 2011 (GB) .................................. 1111282.8
Mar. 22, 2012 (GB) .................................. 1205042.3

(51) Int. Cl.
| | | |
|---|---|---|
| H01J 13/32 | (2006.01) | |
| F21V 29/00 | (2006.01) | |
| H05B 33/08 | (2006.01) | |
| F21Y 101/02 | (2006.01) | |
| F21Y 105/00 | (2006.01) | |

(52) U.S. Cl.
CPC .......... *F21V 29/004* (2013.01); *H05B 33/0803* (2013.01); *H05B 33/0806* (2013.01); *H05B 33/0827* (2013.01); *H05B 33/0857* (2013.01); *F21Y 2101/02* (2013.01); *F21Y 2105/001* (2013.01); *Y02B 20/383* (2013.01)
USPC ............................. 315/113; 315/192; 315/294

(58) Field of Classification Search
CPC ...... H05B 37/02; H05B 37/032; H05B 41/08; H05B 41/36; F21V 29/00
USPC ......... 315/113, 186, 192, 193, 294, 297, 312; 362/249, 294
See application file for complete search history.

(56) References Cited

U.S. PATENT DOCUMENTS

| | | | |
|---|---|---|---|
| 5,857,767 A * | 1/1999 | Hochstein | ...................... 362/294 |
| 7,396,146 B2 | 7/2008 | Wang | |
| 7,458,706 B1 | 12/2008 | Liu et al. | |
| 7,508,141 B2 | 3/2009 | Wong | |

(Continued)

FOREIGN PATENT DOCUMENTS

| | | |
|---|---|---|
| DE | WO2007007238 A1 | 1/2007 |
| DE | 202009000002 U1 | 1/2009 |

(Continued)

OTHER PUBLICATIONS

Microcontrollers for Advanced Lighting Solutions, Texas Instruments, 2010.

(Continued)

*Primary Examiner* — Tung X Le
(74) *Attorney, Agent, or Firm* — Hanan Farber Patent Agent Ltd.

(57) ABSTRACT

A high power lighting fixture which includes a first multiple of first light emitting diodes (LEDs) mounted and series connected to form a first serial string of LEDs on a first circuit board. A second multiple of second light emitting diodes (LEDs) mounted and series connected to form a second serial string of LEDs on a second circuit board. Mating circuit board connectors are mounted on the first and second circuit boards. The first and second LEDs, the number of first and second LEDs and the current supplied when operating the first and second LEDs are selected so that the lighting fixture is operable at a minimum electrical power rating of 100 Watts. A control signal is received which determines current division between the first and second LEDs.

13 Claims, 11 Drawing Sheets

(56) References Cited

U.S. PATENT DOCUMENTS

| | | | |
|---|---|---|---|
| 7,677,766 | B2 | 3/2010 | Boyer |
| 7,736,035 | B2 | 6/2010 | Chinniah |
| 7,852,011 | B2 | 12/2010 | Peng |
| 2002/0114155 | A1 | 8/2002 | Katogi et al. |
| 2003/0072153 | A1* | 4/2003 | Matsui et al. ............... 362/231 |
| 2003/0112627 | A1* | 6/2003 | Deese ............... 362/249 |
| 2008/0001551 | A1 | 1/2008 | Abbondanzio et al. |
| 2008/0186704 | A1 | 8/2008 | Chou et al. |
| 2009/0237934 | A1 | 9/2009 | Zeng et al. |
| 2009/0290349 | A1 | 11/2009 | Chu et al. |
| 2010/0001648 | A1 | 1/2010 | De Clereq et al. |
| 2010/0134047 | A1 | 6/2010 | Hasnain |
| 2010/0195024 | A1* | 8/2010 | Yoo et al. ............... 349/69 |
| 2010/0296805 | A1 | 11/2010 | Mayer |
| 2011/0043092 | A1 | 2/2011 | Shuja et al. |
| 2011/0279015 | A1* | 11/2011 | Negley et al. ............... 313/501 |
| 2012/0051048 | A1 | 3/2012 | Smit et al. |

FOREIGN PATENT DOCUMENTS

| | | | |
|---|---|---|---|
| EP | 2136123 | A1 | 12/2009 |
| NL | WO2007129231 | A1 | 11/2007 |

OTHER PUBLICATIONS

Application Brief AB32, Luxeon Rebel and Luxeon Rebel ES* Assembly and Handling Information brief AB32 (10/07/30).

Luxeon Rebel ES Datasheet DS61 20110511, 2011 Philips Lumileds Lighting Company.

UK Intellectual Property Office, Combined Search and Examination Report under Sections 17 and 18(3), May 2, 2012.

Combined Search & Examination Report, UK Intellectual property Office, Aug. 1, 2011, App. No. GB1111282.8.

Combined Search & Examination Report, UK Intellectual property Office, May 1, 2012, App. No. GB1205032.4.

Certificate of Grant of Patent, UK Intellectual property Office, Patent No. GB2486134, App. No. GB1205042.3, Nov. 7, 2012.

Notification of Grant, UK Intellectual property Office, Patent No. GB2486372, Oct. 2, 2012.

Communication of Partial European search report, European Patent Office, App No. EP12174820.6, Nov. 26, 2012.

Communication of European search report, European Patent Office, App No. EP12174820.6, Mar. 22, 2013.

* cited by examiner

LIGHT EMITTING DIODE (LED) LIGHTING FIXTURE

CROSS REFERENCE TO RELATED APPLICATIONS

The present application claims priority from patent applications filed in the United Kingdom Intellectual Property Office, patent application GB1111282.8 filed 3 Jul. 2011 and patent application GB1205042.3 filed 22 Mar. 2012 both of the present inventor, the disclosures of which are incorporated herein by reference.

BACKGROUND

1. Technical Field

The present invention relates to illumination fixtures and particularly to an illumination fixture using light emitting diodes (LEDs)

2. Description of Related Art

High intensity discharge (HID) lamps are widely used for illumination in public areas because of the high efficiency available, e.g. 100-140 lumens/watt. HID lamps are supplied from mains voltage by HID ballast circuits installed in or in the vicinity of HID lamp fixture. Modern HID ballasts are microprocessor controlled, i.e. circuit blocks include transistor switches, e.g. gates of MOSFETS, which are controlled by a microprocessor.

FIG. 2 is a cross-sectional view of a conventional HID lamp fixture 200 employing a high intensity discharge lamp (not shown) mounted at the base of a reflector 4a with a lamp holder 38. Lamp holder 38 connects to power terminal 20a on wires between terminals 38a and 38b and terminal 20a. Power terminal 20a provides the connections to ballast circuit 20b. Cable glands in cable gland apertures 18 allow cable entry of electrical cables into housing 2 for termination of cable cores inside housing 2 in terminal 20a for example. Cable glands in cable gland apertures 18 also allow cables or cords to be firmly secured to housing 2. Reflector 4a is constructed to reflect downward the light emitted from the HID lamp. Ballast circuit board 20b which supplies an ignition voltage used to ignite the lamp, typically a high voltage and an operating current which operates the lamp subsequent to ignition. HID lighting fixtures are typically attached using eye 16 approximately 5-7 meters above the surface of the floor to provide indoor lighting.

Although an efficient light source, the use of HID lamp technology has several disadvantages. HID lamps require several minutes to warm up. When the HID lamp is initially cool, an ignition voltage of 3000-5000 volts for instance is typically required to ignite the HID lamp. A re-ignition for the same lamp when the lamp is still hot, may require up to 20,000 volts for re-ignition to occur. The re-ignition when the lamp is still hot may also require a different frequency or phase characteristic for the ignition voltage to avoid risk of blowing up the HID lamp. Lamps and ballasts with hot re-strike capability are much more expensive then ballasts and lamps without hot re-strike capability. Under a drop of mains voltage, when hot re-strike is not used or unavailable, HID lamps remain off for five to ten minutes while they cool down before re-ignition. While HID lamps are in the process of cooling down, other lighting is used which supplies sufficient light just after the mains voltage comes back on. Quartz-halogen lamps are often used for emergency lighting which are lit while the HID lamps are cooling down and waiting for re-ignition. The quartz-halogen lamps require different wiring and fixtures from the HID lamps.

Further, some HID lamps, such as mercury halide lamps may pose an environmental hazard, in that the bulb materials include mercury. This mercury has to be safely disposed of when the metal halide bulb is no longer usable in fixture 100.

Thus, there is an advantage and a need to replace HID lighting with LED lighting.

LEDs are becoming more widely used in consumer lighting applications. In consumer applications, one or more LED dies (or chips) are mounted within a LED package or on a LED module, which may make up part of a low power LED lighting fixture, typically less than 50 Watts which includes one or more power supplies to power the LEDs. Various implementations of LED lighting fixtures are becoming available in the marketplace to fill a wide range of applications. LEDs offer improved light efficiency, a longer lifetime, lower energy consumption and reduced maintenance costs, as compared to HID light sources.

BRIEF SUMMARY

According to features of the present invention, there is provided a lighting fixture including multiple light emitting diodes (LEDs) mounted and interconnected on a circuit board. A heat-heat-transfer-plate may be adapted for assembly at the back ground plane of the circuit board to conduct heat from the circuit board to form a circuit-board-heat transfer plate assembly. The heat-transfer-plate may have thickness greater than 0.5 centimeters. A hollow shell open at the anterior and substantially closed at the posterior of the shell. The circuit board and heat-transfer-plate may be adapted for assembly in an anterior portion of the shell. The hollow shell may be operable to be in thermal contact with the circuit-board-heat-transfer-plate assembly. The hollow shell may be configured to dissipate, through the heat-transfer-plate, heat generated by the LEDs when the LEDs are operating. The LEDs, the number of LEDs and the current supplied when operating the LEDs may be selected so that the lighting fixture may be operable at a minimum electrical power rating of 100 Watts. The LEDs, the number of LEDs and the current supplied when operating the LEDs may be selected so that the lighting fixture may be operable at a minimum electrical power rating of 150 Watts. The shell may be a reflector configured for use in a high intensity discharge (HID) lighting fixture to reflect light from a high intensity discharge lamp mounted at the posterior of the reflector. The shell may be configured to dissipate heat from the circuit-board-heat transfer plate assembly so that the lighting fixture has an illumination use of greater than 20,000 hours. The shell may be generally bell shaped with the mouth of bell at the anterior of the hollow shell. The shell may have a dimension substantially larger than the largest dimension of the circuit board. The hollow shell may be without apertures through the shell. The lighting fixture may be configured to operate as a hanging lighting fixture from the posterior of the shell. At least a portion of the LEDs may be serially connected to form a serial string, the number of LEDs in the serial string may be increased to reduce the forward current per LED and to increase reliability of the light fixture.

According to features of the present invention there is provided a method for constructing a high power lighting fixture, the method mounts and interconnects multiple light emitting diodes (LEDs) on a circuit board. The type of LEDs may be selected along with the number of LEDs and the current supplied when operating the LEDs so that the lighting fixture may be operable at a minimum electrical power rating of 100 Watts. Alternatively, the type of LEDs may be selected along with the number of LEDs and the current supplied when operating the LEDs so that the lighting fixture may be operable at a minimum electrical power rating of 150 Watts. The circuit-board may be configured to be assembled in the anterior portion of a shell so that the shell is in thermal contact with the circuit-board. The shell may be hollow open at the anterior and substantially closed at the posterior of the shell. The circuit board may be for assembly in an anterior portion of the shell. The heat dissipation may be provided from the circuit board to a heat-transfer-plate assembled at the back ground plane of the circuit-board and from the heat-transfer-plate to the shell. A reflector of a high intensity discharge (HID) lamp may be retrofitted as the shell for dissipating heat generated from the LEDs.

According to features of the present invention there is provided a method for constructing a light fixture by using a reflector constructed to reflect light of a high intensity discharge (HID) lamp. The method provides multiple light emitting diodes (LEDs) mounted and interconnected on a circuit board. A heat-transfer-plate for assembly may be provided at the back of the circuit board to form a circuit-board-heat-transfer-plate assembly. The circuit-board-heat-transfer plate assembly may be configured to be assembled in the anterior portion of the reflector so that the reflector is in thermal contact with the circuit-board-heat transfer plate assembly. The circuit-board-heat-transfer-plate may be configured to be assembled in the anterior portion of the reflector so that the reflector is in thermal contact with the circuit-board-heat-transfer-plate assembly.

According to features of the present invention there is provided a kit for constructing a light fixture using a reflector constructed to reflect light from a lamp mounted near the posterior of the reflector. The kit includes multiple light emitting diodes (LEDs) mounted on a circuit board. A heat-transfer-plate mounted at the back of the circuit board to form a circuit-board-heat-transfer-plate assembly. A thermal coupling disposed between the reflector and the circuit-board-heat-transfer-plate assembly. The circuit-board-heat-transfer-plate assembly may be adapted for assembly in the anterior portion of the reflector. A support adapted to connect to the circuit-board-heat-transfer-plate assembly to the reflector. A power terminal adapted to provide power to the LEDs from the housing of the lamp. The lamp may be a high intensity discharge (HID) lamp adapted to receive power from an HID ballast, the kit may further include an electrical connection to the HID ballast and a mechanism to disable the ignition circuit of the HID ballast.

According to features of the present invention there is provided a high power lighting fixture including a first group of multiple light emitting diodes (LEDs) mounted and series connected to form a first serial string of LEDs on a first circuit board. A second group of multiple light emitting diodes (LEDs) mounted and series connected to form a second serial string of LEDs on a second circuit board. Mating circuit board connectors may be mounted on the first and second circuit boards. The mating circuit board connectors are adapted to connect the first and second serial strings in parallel. The first and second LEDs, the number of first and second LEDs and the current supplied when operating the first and second LEDs may be selected so that the lighting fixture may be operable at a minimum electrical power rating of 100 Watts. At least one device mounted on at least one of the circuit boards. The device may be adapted to receive a control signal. Based on the control signal, the device determines current division between the first and second LEDs. The first LEDs and second LEDs have different light emission characteristics. The first LEDs and second LEDs have different spectral emission characteristics. The first and the second LEDS have different spectral emission characteristics and the control signal determines the color characteristics of the light emitted from at least one of the multiple first and second LEDs. The first LEDs and second LEDs may be supplied by a single power supply. The first LEDs and second LEDs may be adapted to be supplied by an electronic HID ballast configured to provide the control signal. The first and second LEDs, the number of first and second LEDs and the current supplied when operating the first and second LEDs may be selected so that the lighting fixture may be operable at a minimum electrical power rating of 150 Watts. The first and second LEDs, the number of first and second LEDs and the current supplied when operating the first and second LEDs may be selected so that the lighting fixture may be operable at a minimum electrical power rating of 200 Watts. A power terminal may be configured to connect to the circuit boards and supply current to the LEDs. The first and second circuit boards may be shaped as sectors of a circle with a radius substantially equal to the radius of a lateral cross section of an anterior portion of a reflector of a high intensity discharge lamp. A heat-transfer-plate mountable in thermal contact with the back ground plane surface of the circuit boards. A hollow shell open at the anterior and substantial closed at the posterior of the shell. The shell is in thermal contact with the heat-transfer-plate mountable at the anterior of the shell and the shell may be configured to dissipate heat through the heat-transfer-plate heat generated when the first and second LEDs may be operating.

According to features of the present invention there is provided a method for controlling color characteristics of light emitted from the high power lighting fixture. The first LEDs and second LEDs have different spectral emission characteristics. The method controls current through at least one of the first and second strings to achieve a desired color emission from the lighting fixture. Current control may be performed by supplying current to the light fixture and dividing the current between the first and second serial strings based on a control signal.

BRIEF DESCRIPTION OF THE DRAWINGS

The invention is herein described, by way of example only, with reference to the accompanying drawings, wherein.

DETAILED DESCRIPTION

Figure 1A:
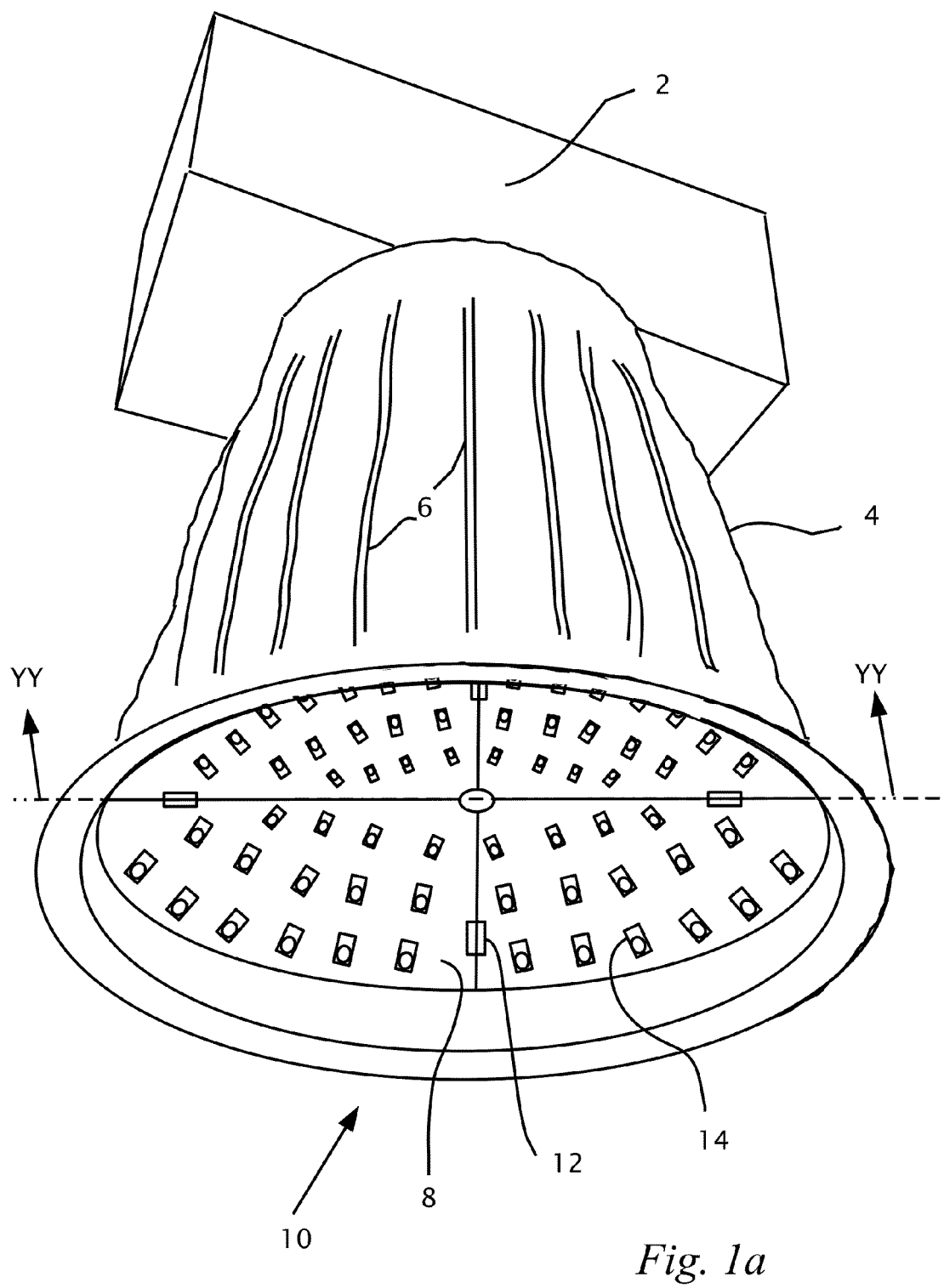
FIG. 1a shows an isometric view of a light emitting diode (LED) lighting fixture 10, according to an example of the present invention.

Reference will now be made in detail to features of the present invention, examples of which are illustrated in the accompanying drawings, wherein like reference numerals refer to the like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

In international patent application publication WO2011/141768 disclosed by the present Applicant, multiple light emitting diodes (LEDs) are attached to the current output of the electronic ballast circuit and current is driven from the current output to light the LEDs. Optionally, prior to driving current through the LEDs, the impedance of the current output is sensed; and the current is driven through the LEDs to light the LEDs upon detection of an impedance significantly lower than an impedance characteristic of the HID lamp. Ignition appropriate to ignite the high intensity discharge is not performed when LEDS are attached to the current output. Alternatively, a signal is provided to disconnect the LEDs during a high voltage output for ignition of the high intensity discharge (HID) lamp By way of introduction, features of the present invention are directed to a light emitting diode (LED) lamp fixture to produce illumination comparable to that of a high intensity discharge (HID) lamp fixture operating at an electrical power rating of around 200-500 W Watts in some examples of the present invention. According to variations of the present invention, the LED lighting fixture may be operable at electrical power rating greater than 100 Watts, or greater than 150 Watts and/or greater than 200 Watts and/or greater than 400 Watts. High power is achieved according to features of the present invention with novel mechanical and thermal designs which allow for increasing area over which heat is produced and by improving heat dissipation. The novel thermal-mechanical design consequently provides an increase in the power rating and the long term reliability of the lighting fixture.

Referring now to the drawings, FIG. 1a shows an isometric view of a light emitting diode (LED) lighting fixture 10, according to an example of the present invention. Lighting fixture 10 includes a circuit housing 2, shell 4 and circuit board (e.g. printed circuit board PCB) 8 with multiple LEDs 14 mounted and interconnected thereon. LEDs 14 may be distributed evenly or unevenly throughout the exposed surface of PCB 8. Distribution over substantially all the PCB surface provides for substantially even distribution of heat generation from LEDs 14. Circuit housing encloses the current source or ballast for driving LEDs 14, which may be an HID ballast converted for use with LEDs according to the teachings of international patent application publication WO2011/141768. Shell 4 functions to dissipate heat from LEDs 14 when operating. Circuit housing 2, shell 4 may be made from a light weight material which may be thermally conductive and/or electrically conductive. The light weight material may be aluminum, zinc alloy or some other metal alloy. Shell 4 may have a opening at the anterior portion. Circuit board 8 may be mounted in the opening at the anterior portion of shell 4. Typically, one linear dimension, e.g. diameter or height, is substantially greater than the largest linear dimension of circuit-board 8. In embodiments of the present invention, shell 4 is generally bell-shaped with the height of the bell substantially greater than the diameter of the opening of shell 4 at the anterior portion of shell 4. In other embodiments of the present invention, lighting fixture 10 is a hanging fixture. Shell 4 may have fins 6 to increase the surface area of shell 4 to improve thermal dissipation away from fixture 10. Circuit board 8 has multiple electrically interconnected LEDs 14 which are physically mounted, e.g. surface mounted and electrically connected on circuit board 8. Four circuit boards 8 are shown in fixture 10 which may be interconnected together electrically using mating interboard connectors 12. Four interconnected boards 8 are shown by way of example only. In different variations of the present invention, any number of boards 8 e.g. 2, 3, 4, 5, 6, 7 . . . etc. may be interconnected Moreover, by way of example only the interconnecting boards 8 in fixture 10 are shown to have the shape of sectors of a circle, the radius of which corresponding to the circular cross section of the anterior portion of shell 4.

In other embodiments of the present invention, the cross sectional shape of shell 4 may vary, e.g. hexagon, octagon and correspondingly the shape of circuit boards 8 may vary.

In other examples of the present invention, circuit housing 2 may be physically separate and located elsewhere, e.g. in the ceiling as a junction box. The electrical connection between the ceiling mounted junction box and circuit board 8 is with an electrical cable adapted to supply current to circuit board 8.

Figure 1B:
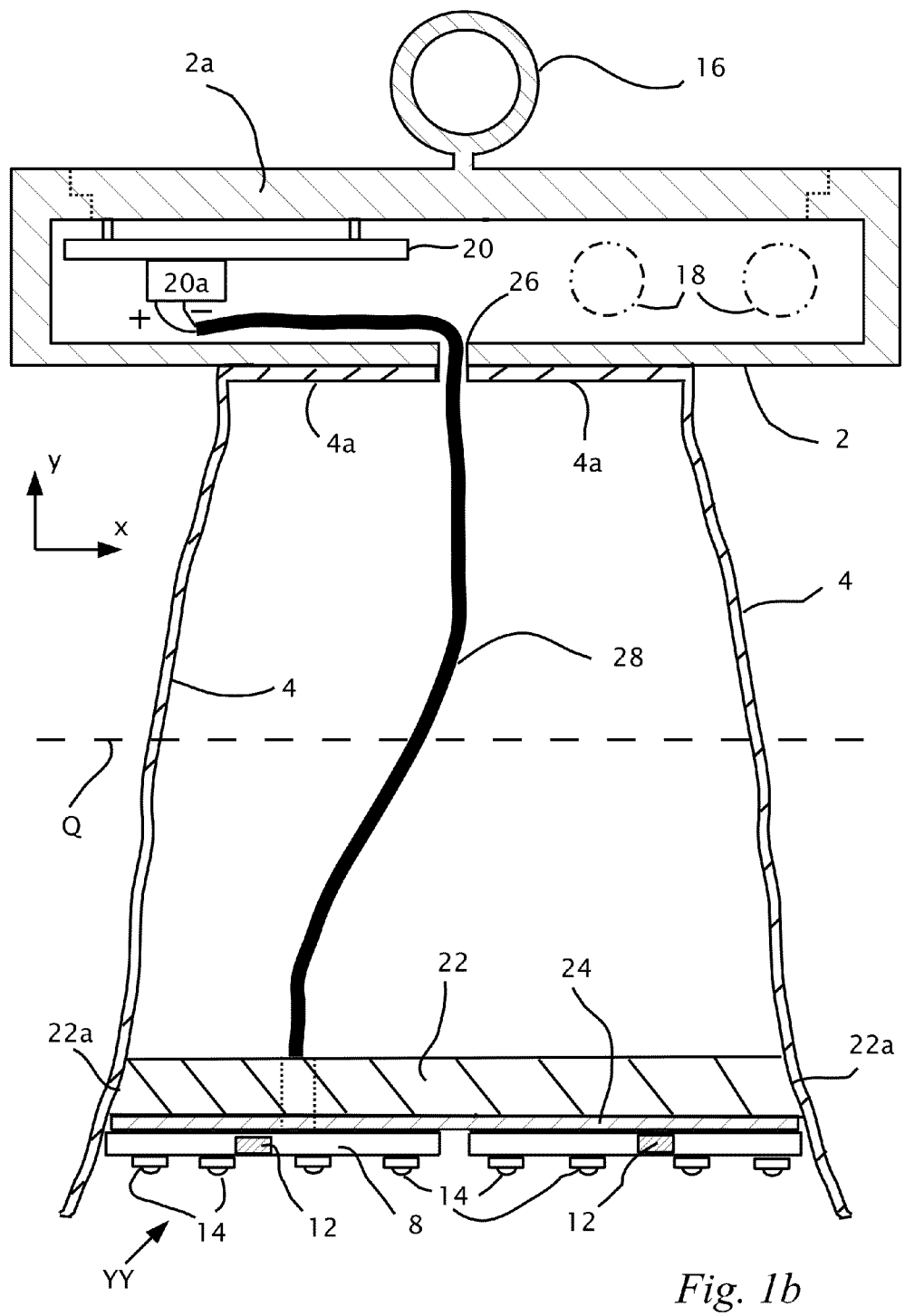
FIG. 1b shows a cross sectional view of a exemplary light emitting diode (LED) lighting fixture, according to the present example of the present invention.

FIG. 1b shows a cross sectional view YY of exemplary light emitting diode (LED) lighting fixture 10, according to the present example of the present invention. FIG. 1b illustrates additional aspects of LED fixture 10. heat transfer plate 22 in thermal contact with the back ground plane of circuit board 8 functions to conduct heat away from circuit board 8 while operating. An optional thermal pad or other thermal conductive material 24 may be disposed between circuit board 8 and heat-transfer-plate 22 to improve heat conduction from circuit board 8. Lateral dashed line Q (in parallel with axis x) is approximately the midpoint longitudinally inside shell 4. Above (toward the ceiling) line Q inside shell 4, is a posterior portion of shell 4 and below line Q (toward the floor) inside shell 4 is an anterior portion of shell 4.

An eye 16 may be a molded part of circuit housing 2, or mechanically attached to housing 2 using any number of ways known in the art of mechanically attachment. A hook (not shown) may be attached to an overhead structure such as lighting rail which allows fixture 10 to be suspended on the hook with use of eye 16 above an area to be illuminated by fixture 10. Housing 2 typically includes a lid 2a to allow access for electrical connections in housing 2. Housing 2 and shell 4 may be a single molded part or housing 2 may be attached to shell 4 using any number of ways known in the art of mechanically attaching.

A circuit board 20 is located and attached to housing 2 and some of the circuit components of circuit 20 may also be attached to housing 2 or lid 2a so that housing 2 or lid 2a may serve as a heat-transfer-plate for some of the circuit components. Alternatively circuit 20 may have its own heat transfer plate for some of the circuit components. Cable glands in cable gland apertures 18 allow cable entry of electrical cables into housing 2 for termination of cable cores inside housing 2 in termination power block 20a for example. Cable glands in cable gland apertures 18 also allow cables or cords to be firmly secured to housing 2. In the anterior portion of shell 4 is a circuit-board-heat transfer plate assembly which includes heat-transfer-plate 22, thermal pad 24 and printed circuit boards 8. heat-transfer-plate 22 may be an integral part of shell 4 in which shell 4, housing 2 and heat-transfer-plate 22 may be cast in one piece during manufacture of fixture 10. heat-transfer-plate 22 may attach to shell 4 at side 22a of heat transfer plate 22 by a thermally conducting adhesive. Side 22a may be welded to shell 4 or may be attached with fasteners, e.g. screws through shell 4 into side 22a with a heat transfer plate compound inserted between side 22a and shell 4. PCB 8 may attach to heat-transfer-plate 22 with screws going through PCB 8 into heat transfer plate 22e. The tightening of the screws compresses thermally and/or electrically conductive thermal pad 24 between heat transfer plate 22 and PCB 8. During operation of fixture 10, heat generated by LEDs 14 may be dissipated through the substrate of PCB 8 (thermally conductive but not electrically conductive), through thermal pad 24 and into heat transfer plate 22. Heat in heat transfer plate 22 may also further dissipate conductively through side at thermal coupling 22a and into shell 4. Aperture 26 allows cable 28 to pass between the inside of housing 2 and the inside of shell 4 and allows electrical connection between circuit board 20 and PCB 8 located in the anterior potion of shell 4.

Figure 1C:
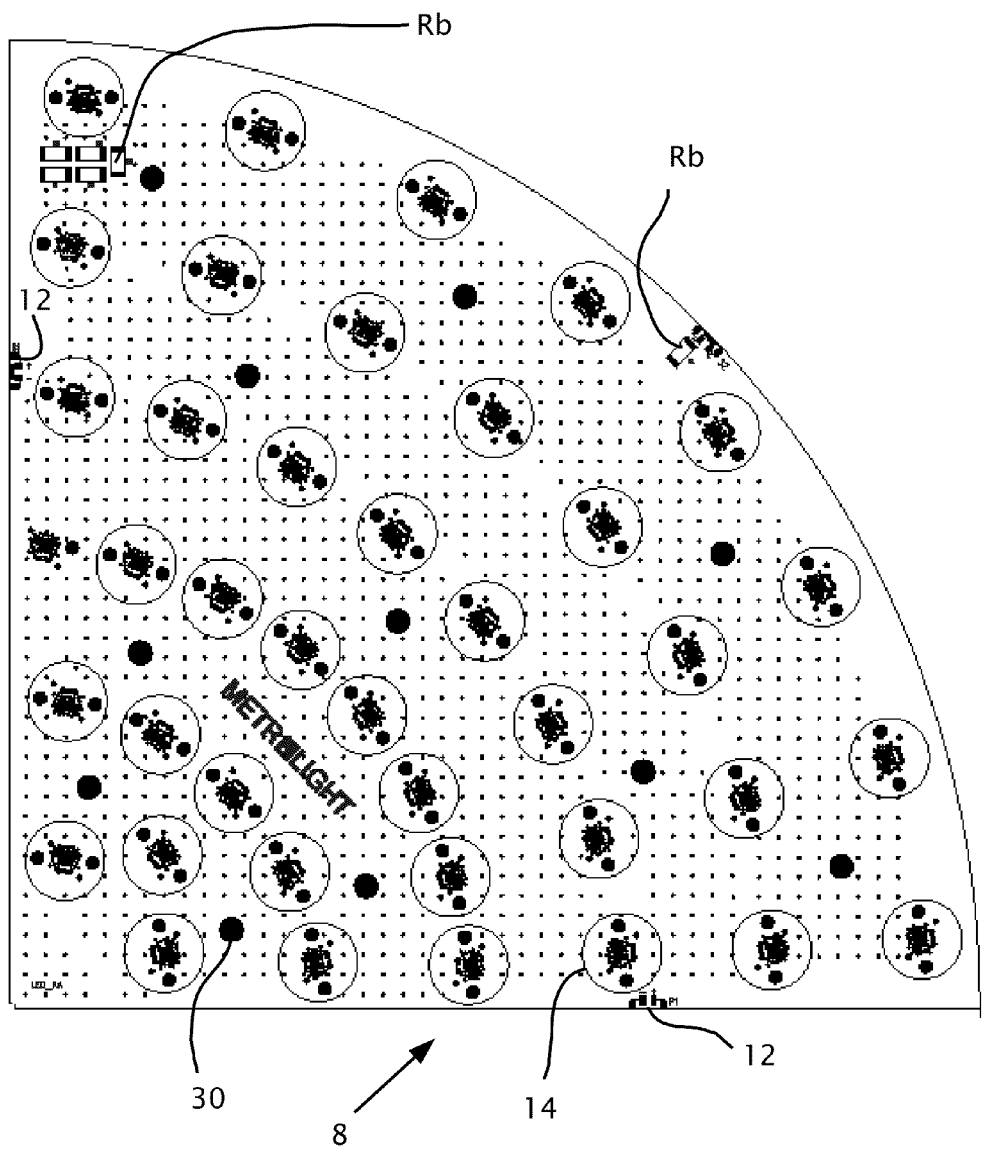
FIG. 1c shows further details of a printed circuit board (PCB), according to an aspect of the present invention.

Reference is also now made to FIG. 1c which shows further details of PCB 8, according to an aspect of the present invention. Numerous holes 30 allow for screws to be inserted through so as to attach PCB 8 to heat transfer plate 22. Controllable resistors Rb are also attached to PCB 8 and electrically connected to LEDs 14. Circuit boards 8 are electrically connectable to other circuit boards 8 with connectors 12. LEDs 14 may additionally have lenses mounted on circuit board 8 to vary the output angle of light produced from LEDs 14 or diffusers may by mounted on circuit board 8 to diffuse light from LEDs 14. LEDs 14 may be evenly distributed throughout the surface of circuit board 8.

Figure 1D:
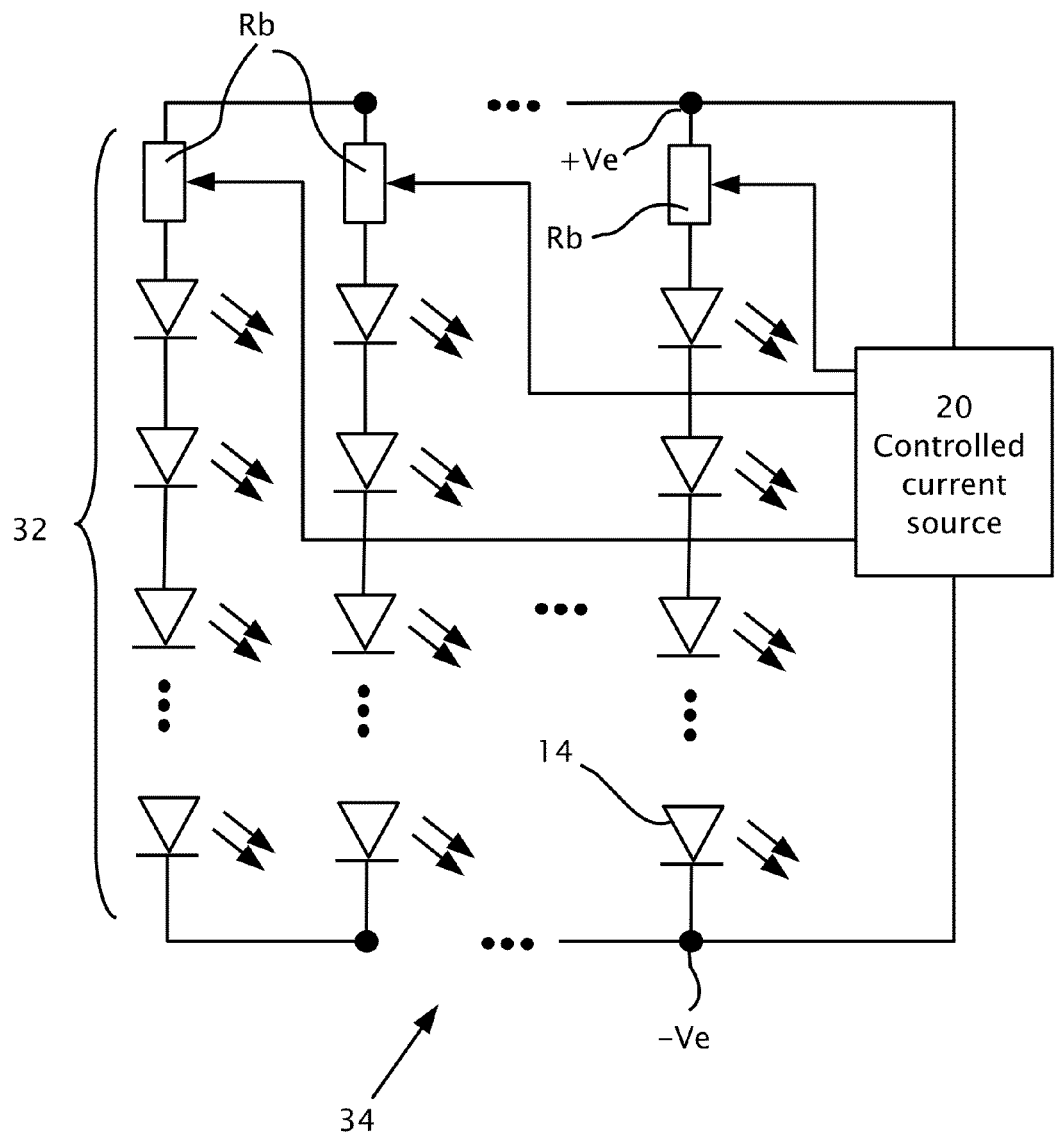
FIG. 1d shows a circuit diagram, according to an aspect of the present invention.

Reference is now also made to FIG. 1d which shows a circuit diagram 34, according to an aspect of the present invention. Multiple LEDs 14 are connected in series to form a series string 32. Also connected in series in serial string 32 is a controllable variable impedance, e.g. variable resistor Rb, a variable current limiter or a linear regulator which may receive a control signal to control current through string 32. The control signal may be an analogue signal or a digital signal which is appropriate for the controllable variable resistor Rb, the variable current limiter or the linear regulator. Alternatively the DC output of power output of current source 20 or another power source of DC may be applied to an input of a DC to DC converter which may include a microprocessor for controlling current, voltage and/or power at an output of the DC to DC converter. The output of the DC to DC converter may be wired in series with the multiple LEDs 14 (which are connected in series) or in parallel across multiple LEDs 14 connected in series. Serial string 32 may be connected in parallel with other strings 32 which are also connected in parallel across controlled current source 20. The polarity of source 20 on +Ve and −Ve is such that each string 32 is forward biased. Variable resistor Rb in one or more strings 32 may receive a control signal optionally from a microprocessor controlling current source 20 which may be configured determine the resistance of string 32 or otherwise limit or set the current flowing in string 32. According to a feature of the present invention string 32 may be located and connected on a single PCB 8 and connected in parallel with other PCBs 8 via connector 12. Alternatively a PCB 8 may have multiple serial strings 32 all connected in parallel on a single PCB 8 which then may be connected in parallel or series to another PCB 8 via connectors 12. Alternatively any number of series parallel or parallel series connections may be made on a PCB 8 and connected to other PCBs 8 via connectors 12 in a series or parallel fashion. The LEDs 14, the number of LEDs 14 and the current supplied to a board 8 when operating the LEDs are typically selected so that lighting fixture 10 is operable at a minimum electrical power rating of between 100 Watts and 200 Watts or more up to 400-500 Watts.

Figure 1E:
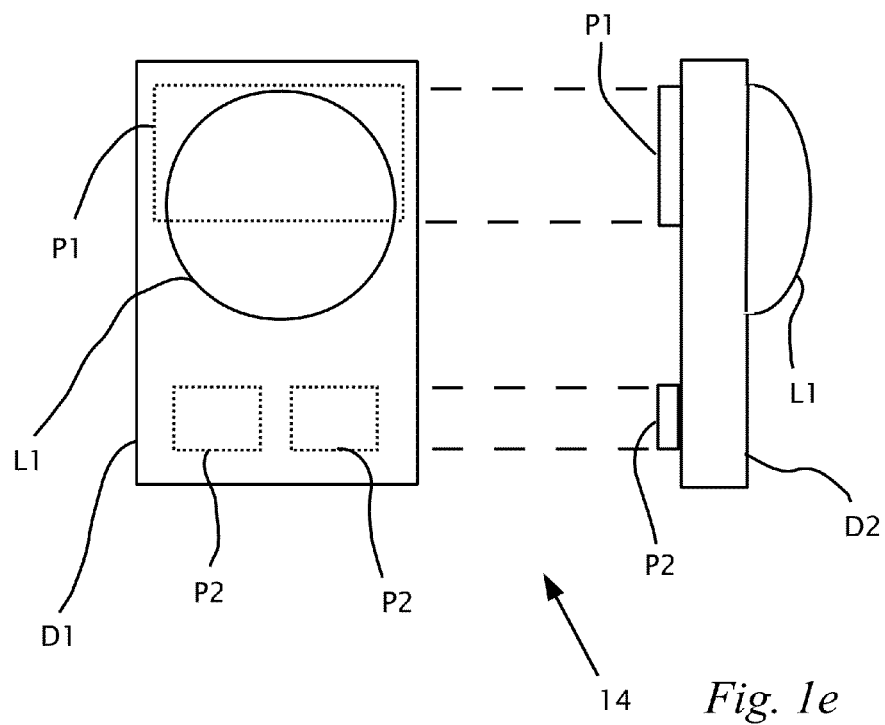
FIG. 1e shows more details of a light emitting diode (LED) with a plan and side view of LED, according to an aspect of the present invention.
Figure 3A:
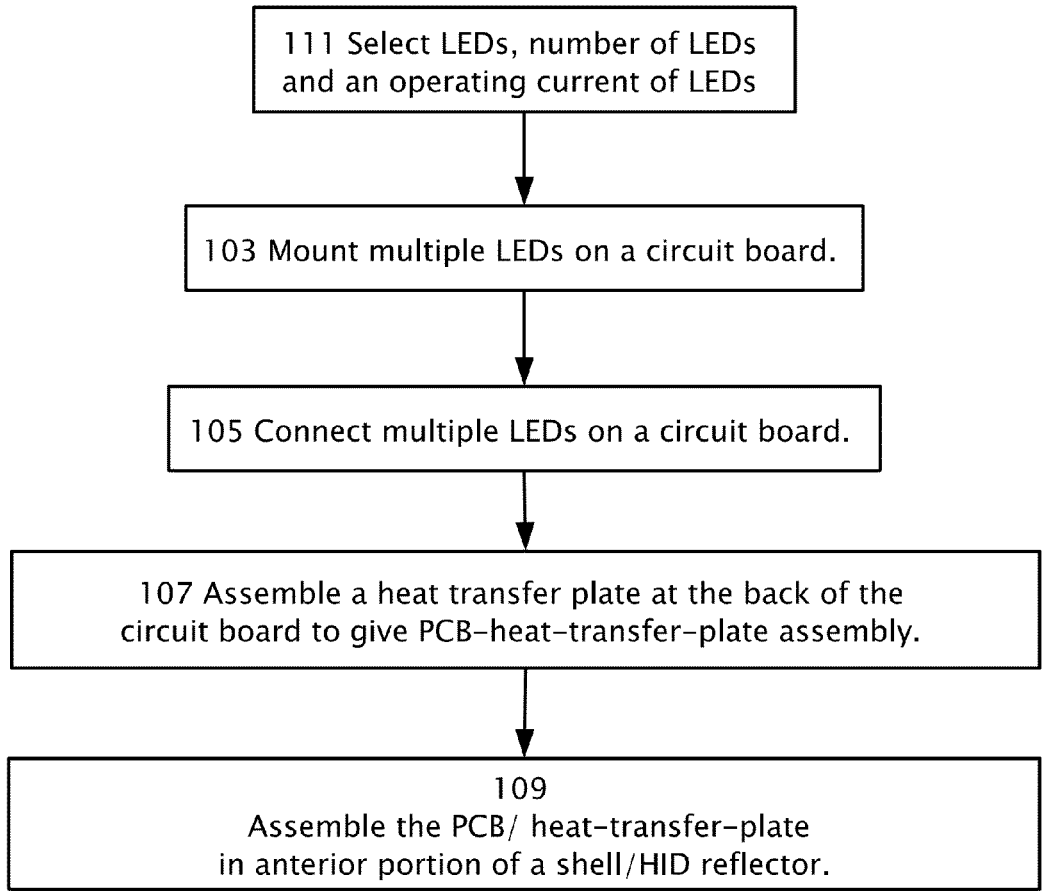
FIG. 3a shows a method, according to an aspect of the present invention.

Reference is now made to FIG. 3 which shows a method 101 and to FIG. 1e which shows more details of an LED 14 with a plan and side view of LED 14, according to an aspect of the present invention. In step 103 multiple LEDs 14 are mounted on circuit board 8. LEDs 14 may be Philips Lumileds™, LUXEON Rebel ES™, part number LXW8-PW40 for example which provide a thermal pad P1, anode pad P2 and cathode pad P3, lens L1 mounted on a die D1. Thermal pad P1 in step 103 is mounted on a thermally conductive but electrically non-conductive front portion of circuit board 8. A feature of the LUXEON Rebel ES™ LED is that a failure of an LED leaves a short circuit around the LED so a serial string of LEDs may still operate. According to an exemplary aspect, in step 105, multiple LEDs 14 may be connected in series on circuit board 8 such that cathode pad P3 of one LED 14 connects to an anode pad P2 of another LED and so on. Finally multiple LEDs 14 connected in series may be then be further connected in series with a controllable variable resistance Rb or current limiter to form a series string 32. According to the exemplary aspect for step 111 described later on, a board 8 consists of a single series string 32 and board 8 is then connected in parallel with three other boards 8 (via connectors 12) where each board 8 has a single series string 32.

Figure 1F:
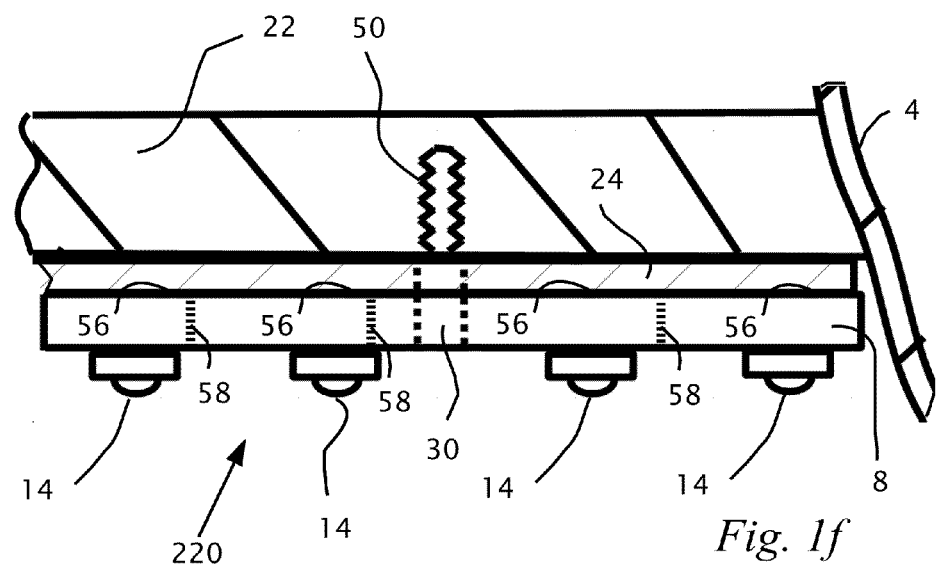
FIG. 1f which shows a partial cross sectional view, according to an aspect of the present invention.

Referring now to FIG. 1f which shows a partial cross sectional view 220, view 220 includes shell 4, screw thread 50, through hole 30, heat transfer plate 22, thermal pad 24, multiple LEDs 14, vias 58 and circuit board 8. In step 107 heat transfer plate 22 is assembled to the back portion 56 of circuit board 8. Sandwiched between the back portion 56 of circuit board 8 and heat transfer plate 22 is thermal pad 24. Alternatively back portion 56 of circuit board 8 may be in direct contact with heat transfer plate 22 and/or a heat transfer plate compound, e.g. silicone polymer may be applied between to improve thermal conduction between the back portion 56 of circuit board 8 and heat transfer plate 22. Additionally multiple vias 58 may also improve thermal conduction from the front portion of circuit-board 8 to the back portion 56 of circuit-board 8. Vias 58 are typically located in close vicinity of LEDs 14. A screw (not shown) may be inserted into through hole 30 and screwed into screw thread 50 so as to compressively attach circuit board 8 to heat transfer plate 22. Alternatively circuit board 8 may be bonded to heat transfer plate 22 using a thermally conductive adhesive.

Circuit board 8 thermal pad 24 and heat-transfer-plate 22 may form a circuit-board-heat transfer plate assembly. In step 109, the circuit-board-heat-transfer-plate assembly may be assembled in the anterior potion of shell 4 as shown in FIG. 1b. Heat-transfer-plate 22 may attach to shell 4 at side 22a of heat-transfer-plate 22 by a thermally conducting adhesive, side 22a welded to shell 4 or screws through shell 4 into side 22a with a heat-transfer-plate compound inserted between side 22a and shell 4.

In step 111 the type of LEDs 14 are selected, the number of LEDs 14 and the current supplied when operating the LEDs 14 when the lighting fixture 10 is operable at a minimum electrical power rating of 100 Watts. This exemplary aspect for step 111 assumes that a board 8 includes a single series string 32 and four boards 8 are utilized in fixture 10 and are connected in parallel with connectors 12. From the data sheet for the LUXEON Rebel ES™ (DS61 20110511 Philips Lumileds Lighting™), selection of LEDs 14 takes into consideration the luminous efficacy of LEDs 14. Luminous efficacy is a measure of how well a light source produces visible light. Luminous efficacy is the ratio of luminous flux to power. Depending on context, the power can be either the radiant flux power rating of fixture 10 output, or it can be the total electric power consumed by fixture 10. A feature of the LUXEON Rebel ES™, LED is that luminous efficacy increases with lower forward current of LED 14 and decreases with increased forward current of LED 14. A typical current operating range of forward current for LED 14 is between 350 milli-Amperes (mA) and 1 Ampere. Data sheet for LED 14 for forward current of 350 mA; gives a forward voltage of 2.85 Volts (V) and 1 W per LED, giving a flux of 130 lumens at a color temperature of 4100 kelvin; for forward current of 700 mA; gives a forward voltage of 3.0V and 2.1 W per LED and for a forward current of 1 A; a forward voltage of 3.1V and 3.1 W per LED. For a total 100 W electrical power rating fixture 10 means that each board 8 will consume 25 W. Keeping current consumption low by LEDs 14 and noting that luminous efficacy increases with lower forward current of LED 14 gives lower heat dissipated by LEDs 14. The number of LEDs per circuit-board 8 is 25 W divided by 1 W, giving 25 LEDs per board 8. For a comparable power rating for LED fixture 10 with a HID fixture of 160 W, gives 40 W divided by 1 W, giving 40 LEDs per board 8.

Retrofitting an Existing HID Light Fixture into a LED Light Fixture

Figure 2:
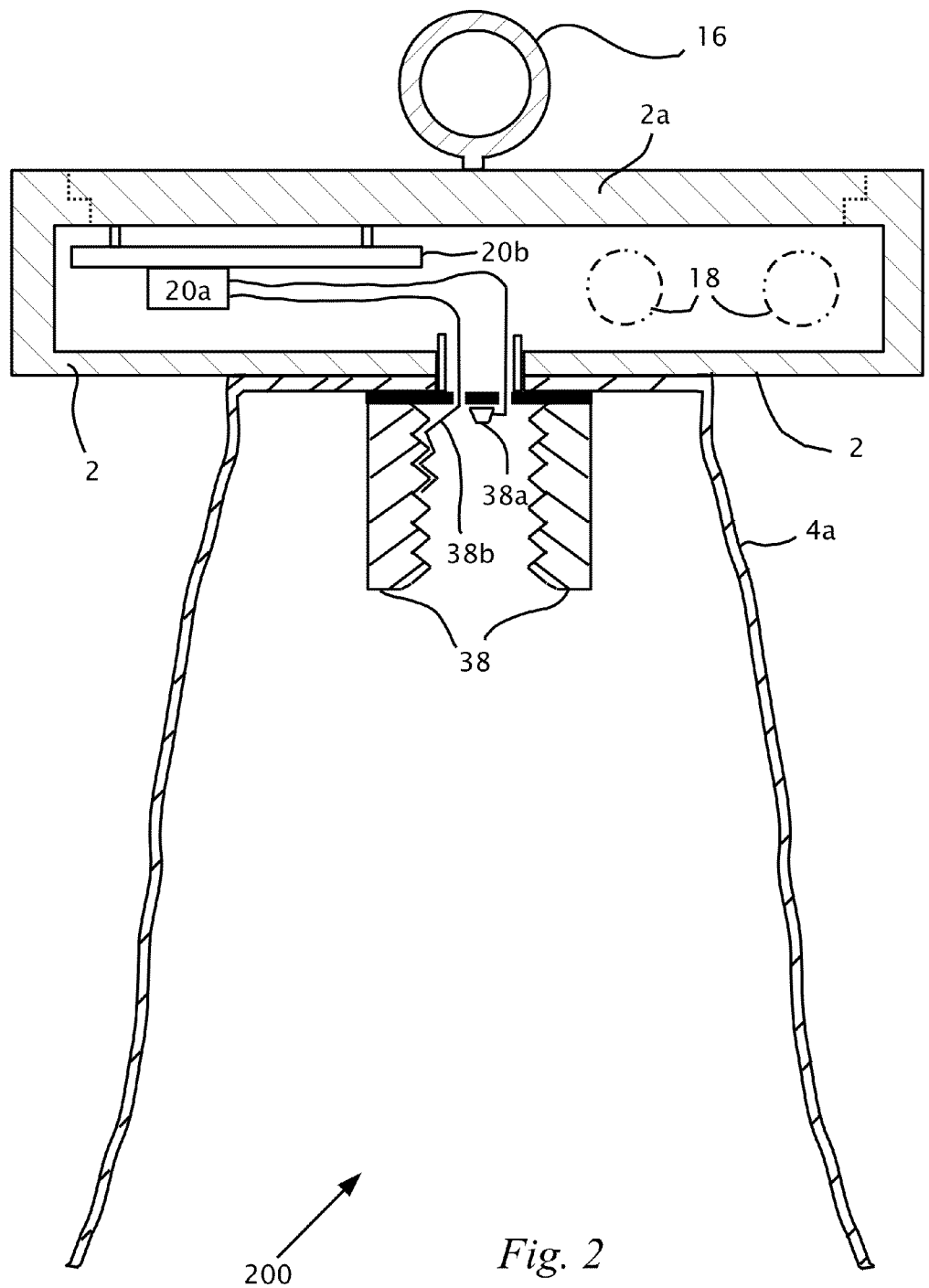
FIG. 2 is a cross-sectional view of a conventional HID lamp fixture employing a high intensity discharge lamp (not shown) mounted at the base of a reflector with a lamp holder.
Figure 2A:
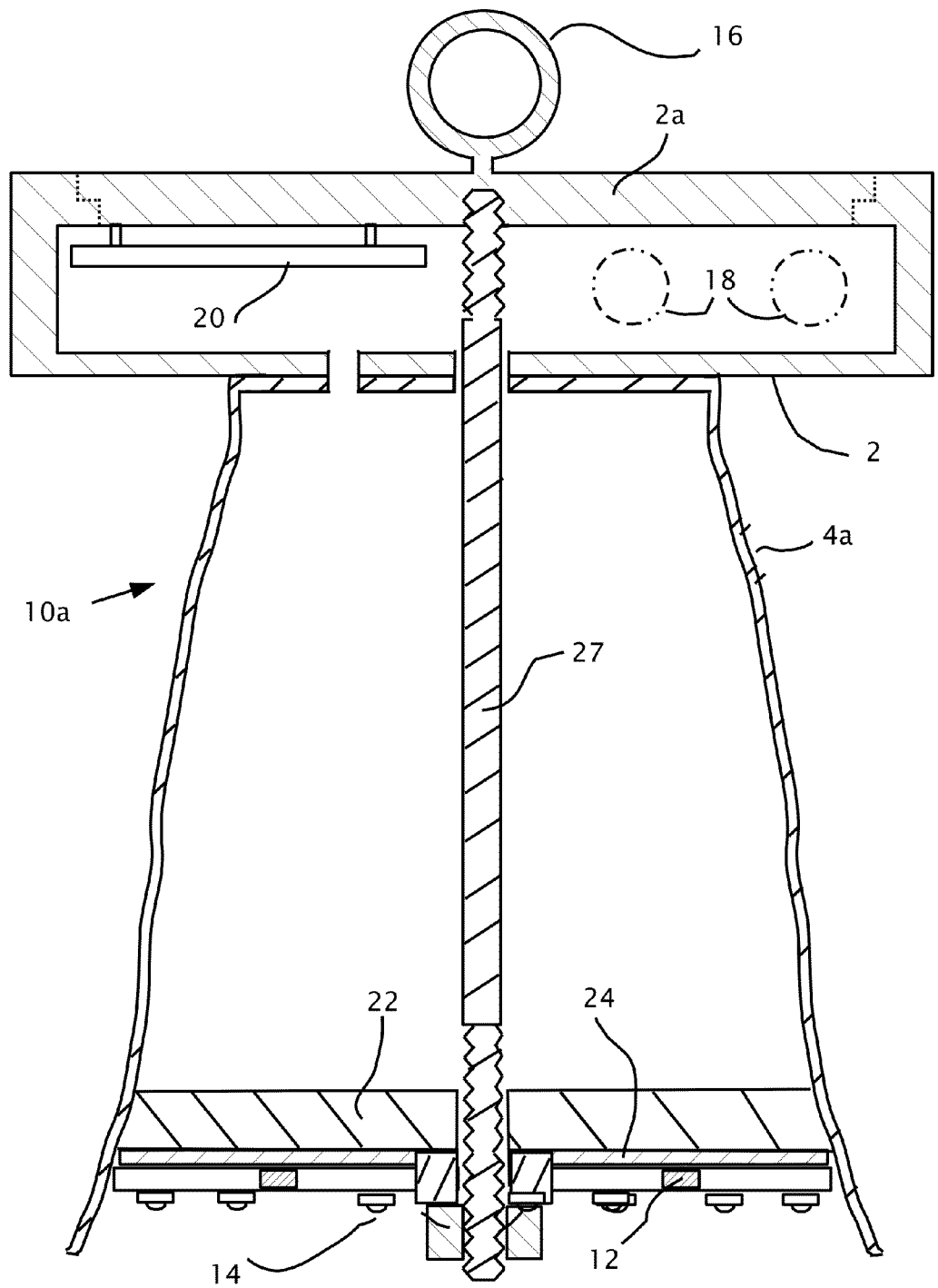
FIGS. 2a and 2b show examples of a retrofitted lamp fixture, according to aspects of the present invention.
Figure 2B:
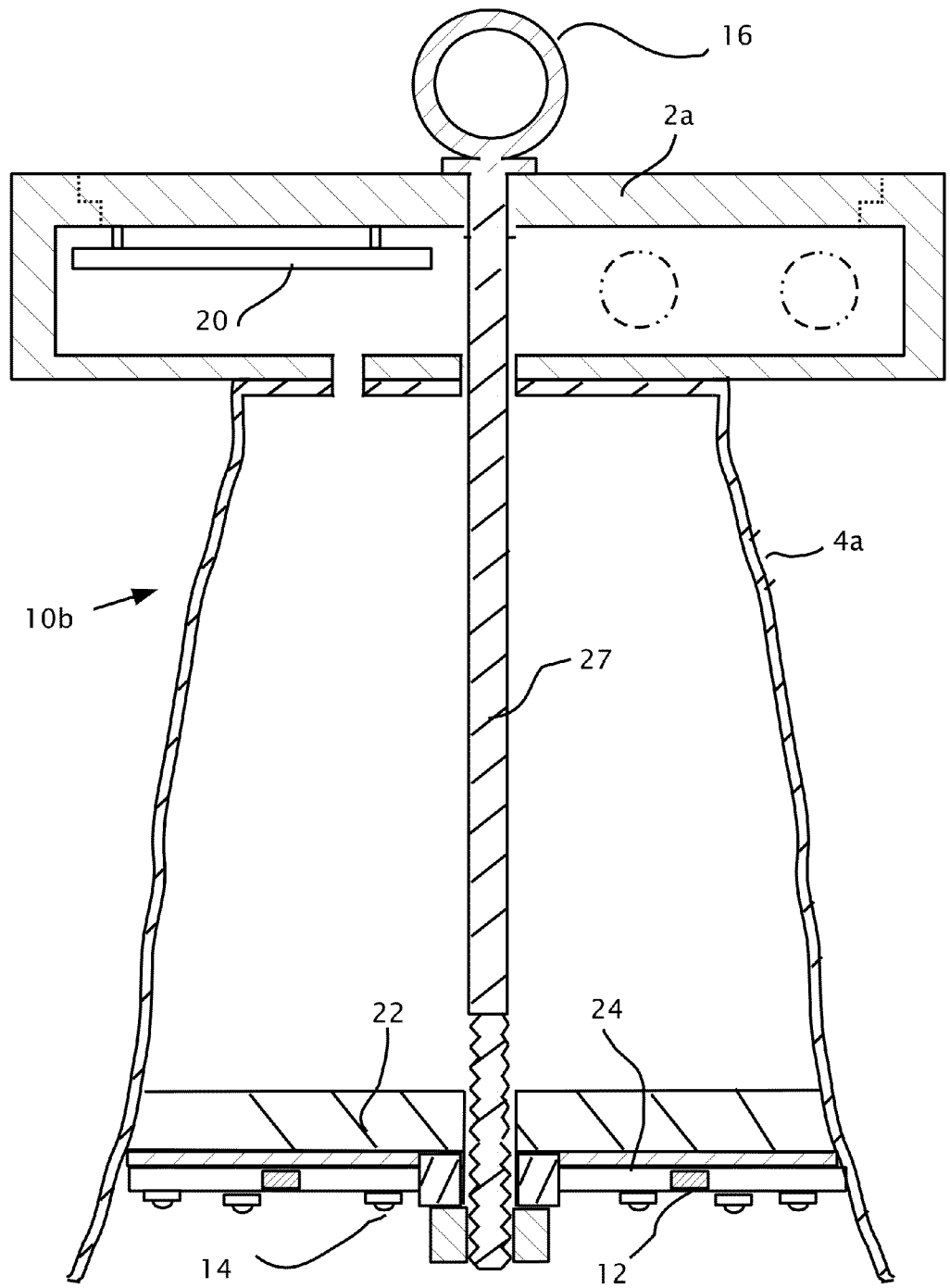
Figure 3B:
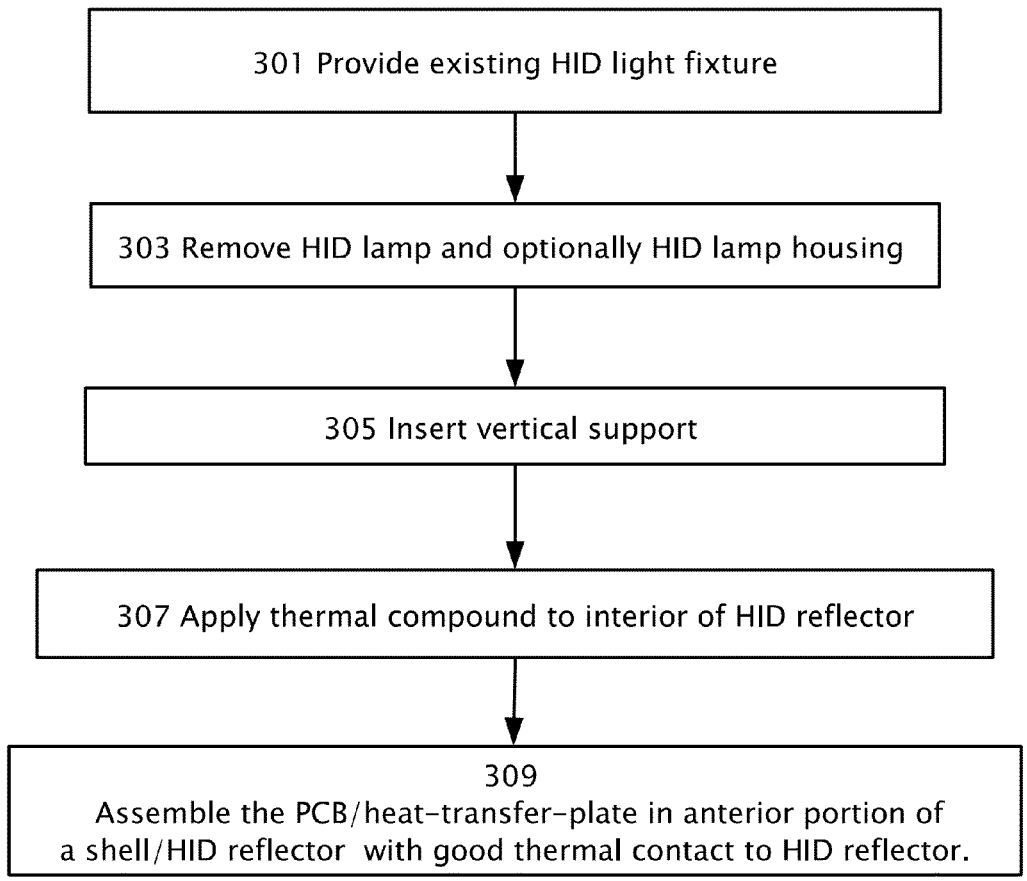
FIG. 3b shows a method for retrofitting HID light fixture into a LED light fixture, examples of which are shown in FIG. 2a and FIG. 2b.

Reference is now again made to FIG. 2 which illustrates an example of a conventional HID light fixture 200. According to embodiments of the present invention, existing HID light fixtures, of which HID light fixture 200 is example may be retrofit into LED light fixtures of similar illumination 200-500 W as that of the HID lamp being replaced. Reference is now also made to FIGS. 2a, 2b and 3b, a method 300 for retrofitting HID light fixture into LED light fixture 10 examples of which are shown in FIG. 2a and FIG. 2b. An existing HID light fixture 200 is provided (step 301). Typically, for retrofit process 300, the HID lamp is turned off, electrical supply to HID ballast 20a is removed and HID lighting fixture is removed from its normal position near the ceiling to a work table. HID lamp is removed from HID lamp housing 38, and in some examples of the present invention HID lamp housing 38 is also removed as shown in FIGS. 2a and 2b. A vertical support 27 may be inserted (step 305) optionally through housing 2 and lid 2a. Drilling or punching through housing 2 lid 2a may be suggested, otherwise a hole may be suggested through the posterior or closed end of reflector 4a. A thermal conduction compound or adhesive is applied to the edges of heat-transfer-plate 22 to provide heat conduction to former HID lamp reflector 4a and presently a hollow shell for heat dissipation in LED light fixtures 201. Circuit-board 8 heat-transfer-plate 22 assembly is attached (step 309) to vertical support 27 completing the physical assembly. Electrical assembly may include threading cable 28 to current source 20 as shown in FIG. 1b. Alternatively, electrical connection may be provided by HID housing 38 by using a connector which mates housing 38.

Color Control in the High Power LED Fixture 10

Figure 4:
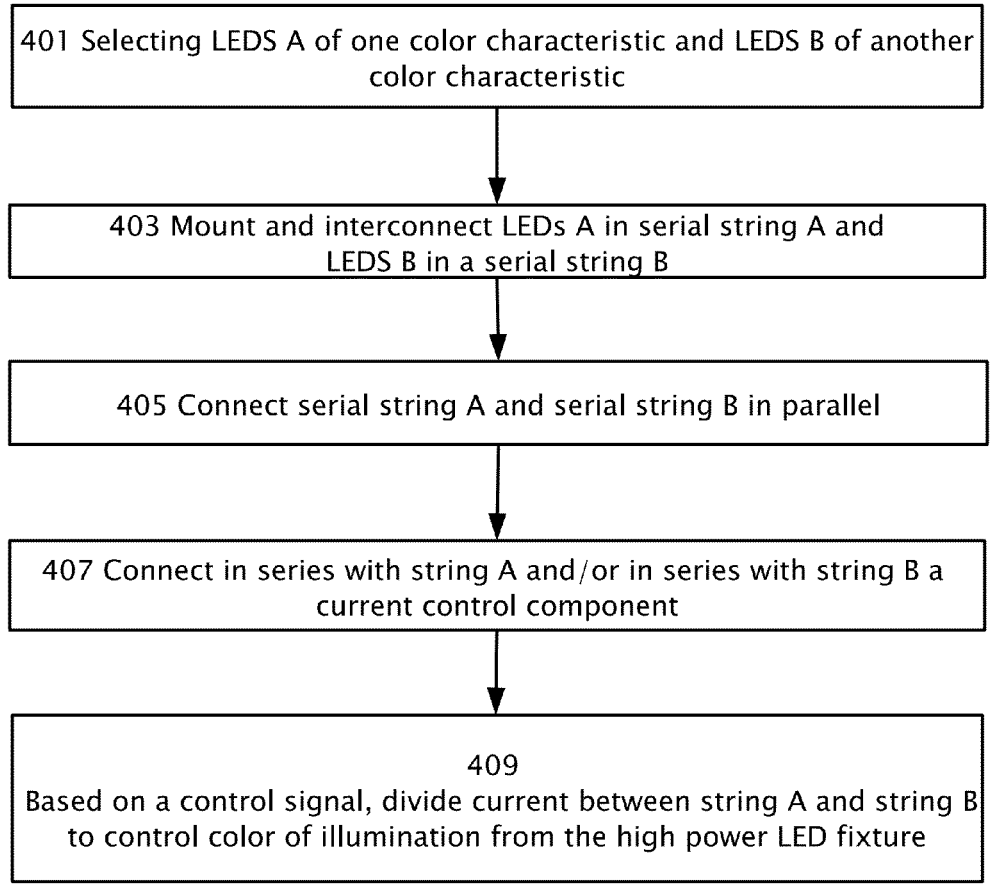
FIG. 4 includes a flow chart for adjusting color characteristics of the LED illumination in a LED lighting fixture.

During the manufacture of illumination LEDS, precise color characteristics are difficult to control. Moreover, different uses whether in stores or in stadiums have different requirements as to preferred color characteristics. According to features of the present invention, color characteristics of the high power LED fixture may be adjusted either during manufacture or installed on site. Reference is now made to FIG. 4 which includes a flow chart for adjusting color characteristics of the LED illumination in LED lighting fixture 10. In step 401, LEDS 14A are selected of one color characteristic and LEDS 14B are selected of another color characteristic. In step 403, LEDS A are mounted on circuit board 8 and connected in series to form a serial string of LEDs 14A and LEDS 14B are mounted on the same or another circuit-board 8 and connected in series to form a serial string B of LEDs 14B. Serial string A and Serial string B are connectible in parallel (step 405). In step 407, a current control component, e.g. variable resistor Rb, linear regulator or DC to DC converter is connected in series with string A and/or in series with string B. The current control component receives a control signal, optionally from the same microprocessor which controls the current source driver that drives LEDS 14A and 14B. The control signal may be an analogue signal or a digital signal which is appropriate for the current control component. In step 409, based on a control signal the current between string A and string B is divided to adjust the color of the illumination from LED lighting fixture 10.

The terms "dissipate", "dissipating" and "dissipation" as used herein refer to the dissipation of heat by ways which include thermal conduction, thermal convection or thermal radiation.

The term "high power" as used herein refers to an electrical power rating of at least 50 Watts.

The definite articles "a", "an" is used herein, such as "a LED", "a shell" have the meaning of "one or more" that is "one or more LEDs" or "one or more shells".

Although selected features of the present invention have been shown and described, it is to be understood the present invention is not limited to the described features. Instead, it is to be appreciated that changes may be made to these features without departing from the principles and spirit of the invention, the scope of which is defined by the claims and the equivalents thereof.

What is claimed is:

1. A high power lighting fixture comprising:
   a first plurality of first light emitting diodes (LEDs) mounted and series connected to form a first serial string of LEDs on a first circuit board;
   a second plurality of second light emitting diodes (LEDs) mounted and series connected to form a second serial string of LEDs on a second circuit board;
   wherein said first LEDs and said second LEDs have different spectral emission characteristics;
   mating circuit board connectors mounted on said first and said second circuit boards wherein said mating circuit board connectors are adapted to connect said first and second serial strings in parallel; and
   at least one device mounted on at least one of the circuit boards, wherein the device is adapted to receive a control signal, wherein based on the control signal said device determines current division between the first and second LEDs, wherein the first and second LEDs, the number of first and second LEDs and the current supplied when operating the first and second LEDs are selected so that the lighting fixture is operable at a minimum electrical power rating of 100 Watts.

2. The high power lighting fixture according to claim 1, wherein said control signal determines the color characteristics of the light emitted from at least one of the pluralities of the first and second LEDs.

3. The high power lighting fixture according to claim 1, wherein said first LEDs and second LEDs are supplied by a single power supply.

4. The high power lighting fixture according to claim 1, wherein said first LEDs and second LEDs are adapted to be supplied by an electronic HID ballast configured to provide said control signal.

5. The high power lighting fixture according to claim 1, wherein the first and second LEDs, the number of first and second LEDs and the current supplied when operating the first and second LEDs are selected so that the lighting fixture is operable at a minimum electrical power rating of 150 Watts.

6. The high power lighting fixture according to claim 1, wherein the first and second LEDs, the number of first and second LEDs and the current supplied when operating the first and second LEDs are selected so that the lighting fixture is operable at a minimum electrical power rating of 200 Watts.

7. The high power lighting fixture according to claim 1, further comprising:
   a power terminal configured to connect to the circuit boards and supply current therethrough to the LEDs.

8. The high power lighting fixture according to claim 1, wherein said first and second circuit boards are shaped as sectors of a circle with a radius substantially equal to the radius of a lateral cross section of an anterior portion of a reflector of a high intensity discharge lamp.

9. The high power lighting fixture according to claim 1, further comprising:
   a heat-transfer-plate mountable in thermal contact with the back ground plane surface of the circuit boards.

10. The high power lighting fixture according to claim 9, further comprising:
   a hollow shell open at the anterior and substantial closed at the posterior of the shell, wherein said shell is in thermal contact with said heat-transfer-plate mountable at the anterior of said shell and wherein said shell is configured to dissipate heat through the heat-transfer-plate heat generated when the first and second LEDs are operating.

11. A method for controlling color characteristics of light emitted from a high power lighting fixture, the high power lighting fixture including a first plurality of first light emitting diodes (LEDs) mounted and series connected to form a first serial string of LEDs on a first circuit board and a second plurality of second light emitting diodes (LEDs) mounted and series connected to form a second serial string of LEDs on a second circuit board, wherein the first LEDs and second LEDs have different spectral emission characteristics, the method including the steps of:
   enabling mating of respective circuit board connectors mounted on said first and second circuit boards thereby connecting said first and second serial strings in parallel;
   enabling controlling current through at least one of said first and second serial strings to achieve a desired color emission from the lighting fixture; and
   selecting the first and second LEDs, the number of first and second LEDs and the current supplied when operating the first and second LEDs so that the lighting fixture is operable at a minimum electrical power rating of 100 Watts.

12. The method according to claim 11, further comprising the step of:
   wherein said controlling current is performed by supplying current to the light fixture and dividing said current between the first and second serial strings based on a control signal.

13. The method according to claim 11, further comprising:
   enabling supplying power to said first LEDs and second LEDs by an electronic HID ballast; and
   enabling providing a control signal from said HID ballast to perform said controlling current.

* * * * *